United States Patent [19]
Chow et al.

[11] Patent Number: 5,382,478
[45] Date of Patent: Jan. 17, 1995

[54] ELECTROCHEMICAL FUEL CELL STACK WITH HUMIDIFICATION SECTION LOCATED UPSTREAM FROM THE ELECTROCHEMICALLY ACTIVE SECTION

[75] Inventors: Clarence Y. Chow, Vancouver; Boguslav M. Wozniczka, Coquitlam, both of Canada

[73] Assignee: Ballard Power Systems Inc., North Vancouver, Canada

[21] Appl. No.: 213,615

[22] Filed: Mar. 15, 1994

[51] Int. Cl.$^6$ .......................................... H01M 8/04
[52] U.S. Cl. ......................................... 429/26; 429/30; 429/34
[58] Field of Search ...................... 429/30, 34, 26, 12, 429/38, 39

[56] References Cited

U.S. PATENT DOCUMENTS

| | | | |
|---|---|---|---|
| 4,973,530 | 11/1990 | Vanderbergh et al. | 429/13 |
| 5,200,278 | 4/1993 | Watkins et al. | 429/26 X |

Primary Examiner—Anthnoy Skapars
Attorney, Agent, or Firm—McAndrews, Held & Malloy, Ltd.

[57] ABSTRACT

An electrochemical fuel cell stack has a humidification section located upstream from the electrochemically active section. The inlet fuel and oxidant streams are introduced into the humidification section without first being directed through the electrochemically active section. The upstream location of the humidification section in the stack enables the number of manifold openings in the active section to be reduced, thereby increasing the area available for the electrochemical reaction.

6 Claims, 6 Drawing Sheets

ELECTROCHEMICAL FUEL CELL STACK WITH HUMIDIFICATION SECTION LOCATED UPSTREAM FROM THE ELECTROCHEMICALLY ACTIVE SECTION

FIELD OF THE INVENTION

The present invention relates to electrochemical fuel cells. More particularly, the present invention relates to an electrochemical fuel cell stack in which the section for humidifying the inlet reactant gases is located upstream from the electrochemically active section of the stack.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product. The anode and cathode reactions in hydrogen/oxygen fuel cells are shown in the following equations:

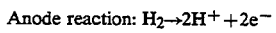

Anode reaction: $H_2 \rightarrow 2H^+ + 2e^-$

Cathode reaction: $1/2 O_2 + 2H^+ + 2e^- \rightarrow H_2O$

In typical fuel cells, the MEA is disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is usually held together by tie rods and end plates. The stack typically includes manifolds and inlet ports for directing the fuel (substantially pure hydrogen, methanol reformate or natural gas reformate) and the oxidant (substantially pure oxygen or oxygen-containing air) to the anode and cathode flow field channels. The stack also usually includes a manifold and inlet port for directing the coolant fluid, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for the coolant water exiting the stack. It is generally convenient to locate all of the inlet and outlet ports at the same end of the stack.

Perfluorosulfonic ion exchange membranes, such as those sold by DuPont under its Nafion trade designation, must be hydrated or saturated with water molecules for ion transport to occur. It is generally accepted that such perfluorosulfonic membranes transport cations using a "water pumping" phenomenon. Water pumping involves the transport of cations in conjunction with water molecules, resulting in a net flow of water from the anode side of the membrane to the cathode side. Thus, membranes exhibiting the water pumping phenomenon can dry out on the anode side if water transported along with hydrogen ions (protons) is not replenished. Such replenishment is typically provided by humidifying the hydrogen-containing fuel stream prior to introducing the stream into the cell. Similarly, the oxygen-containing oxidant stream is typically humidified prior to introducing the oxidant stream into the fuel cell to prevent the membrane from drying out on the cathode side.

In U.S. Pat. No. 5,260,143, issued Nov. 9, 1993, it was disclosed that a new type of experimental perfluorosulfonic ion exchange membrane, sold by Dow under the trade designation XUS 13204.10, did not appear to significantly exhibit the water pumping phenomenon in connection with the transport of hydrogen ions across the membrane. Thus, the transport of water molecules across the Dow experimental membranes did not appear to be necessary for the transport of hydrogen ions as in the Nafion-type membranes. Nevertheless, the transport of hydrogen ions across the Dow membrane requires the membrane to be at least partially saturated to the extent that hydrogen ion transport across the Dow membrane will cease if the membrane dries out.

Thus, hydrogen ion conductivity through ion exchange membranes generally requires the presence of water molecules between the surfaces of the membrane. The fuel and oxidant gases are therefore humidified prior to introducing them to the fuel cell to maintain the saturation of the membranes within the MEAs. Ordinarily, the fuel and oxidant gases are humidified by flowing each gas on one side of a water vapor exchange membrane and by flowing deionized water on the opposite side of the membrane. Deionized water is preferred to prevent membrane contamination by undesired ions. In such membrane-based humidification arrangements, water is transferred across the membrane to the fuel and oxidant gases. Nafion is a suitable and convenient humidification membrane material in such applications, but other commercially available water exchange membranes are suitable as well. Other non-membrane based humidification techniques could also be employed, such as exposing the gases directly to water in an evaporation chamber to permit the gas to absorb evaporated water.

It is generally preferred to humidify the fuel and oxidant gases at, or as close as possible to, the operating temperature and pressure of the fuel cell. The ability of gases such as air to absorb water vapor varies significantly with changes in temperature, especially at low operating pressures. Humidification of the air (oxidant) stream at a temperature significantly below fuel cell operating temperature could result in a humidity level sufficiently low to dehydrate the membrane when the stream is introduced to the cell. Consequently, it is preferable to integrate the humidification function with the active section of the fuel cell stack, and to condition the fuel and oxidant streams to nearly the same temperature and pressure as the active section of the stack. In such an integrated arrangement, the coolant water stream from the active section, which is at or near the cell operating temperature, is normally used as the humidification water stream.

In conventional fuel cell stack designs, such as, for example, the fuel cell stack described and illustrated in U.S. Pat. No. 5,176,966, issued Jan. 5, 1993, the fuel and oxidant streams are typically directed via manifolds or headers through the active section, without participating in the electrochemical reaction, to condition each stream to cell temperature prior to introducing them to the humidification section. In such conventional stack arrangements, the humidification section is located downstream from the active section, so that the reactant streams can first be heated to approximately the cell operating temperature in the manifolds passing through the active section. Once heated to cell operating temperature, the reactant streams can absorb water vapor in the humidification section so that when the humidified fuel and oxidant streams are returned to the active section and fed to the respective anode and cathodes, dehydration of the membrane is avoided.

While location of the humidification section downstream from the active section has the advantage of conditioning the reactant streams to cell temperature prior to humidifying the reactant streams in the humidification section, a downstream humidification section configuration has a significant disadvantage, namely, the manifold passing through the active section for introducing the reactant streams to the humidification section occupies space within each plate forming the active section of the stack. The use of that space by the manifolds carrying the reactant streams through the active section to the humidification section reduces the amount of area on each plate otherwise available to participate in the electrochemical reaction.

A conventional fuel cell stack with a humidification section located downstream from the active section requires a total of nine manifold openings in each plate forming the active section: one manifold opening for each of the inlet fuel, inlet oxidant and inlet coolant water streams; one manifold opening for each of the humidified fuel and humidified oxidant streams and for the outlet coolant/inlet humidification water stream; and one manifold opening for each of the outlet fuel, outlet oxidant and outlet humidification fluid streams. These nine manifold openings are generally located and arranged in the corners of each of the plates forming the active section.

In the present invention, the humidification section is located upstream from the active section, thereby reducing the number of manifold openings in the plates forming the active section from nine to six. It has been found that the inlet fuel and inlet oxidant streams either do not require conditioning in the active section or can be conditioned (heated) outside the stack before introducing them to the humidification section of the stack. The six manifold openings in the active section of the present invention are the humidified fuel, the humidified oxidant and the inlet coolant streams, and the outlet fuel, outlet oxidant and outlet coolant/inlet humidification fluid streams. The reduction in the number of manifold openings from nine in conventional stacks to six in the present invention increases the amount of area available on the active section plates to participate in the electrochemical reaction. While the number of manifold openings in the active section plates is reduced from nine to six in the present invention, the humidification section has nine manifold openings which correspond to the nine manifold openings in the active section plates of conventional fuel cell stacks.

Accordingly, it is an object of the present invention to reduce the number of manifold openings in the plates forming the active section of the fuel cell stack by locating the humidification section upstream from the active section.

It is also an object of the invention to increase the amount of electrochemically active area on each of the plates forming the active section of the fuel cell stack.

SUMMARY OF THE INVENTION

The above and other objects are achieved by an electrochemical fuel cell stack comprising an inlet fuel stream, an inlet oxidant stream, a humidification section and an electrochemically active section. The humidification section is disposed upstream from the active section such that the inlet fuel stream and the inlet oxidant stream are introduced into the humidification section without first being directed through the active section.

The preferred fuel cell stack further comprises an outlet fuel stream and an outlet oxidant stream. The outlet fuel stream and the outlet oxidant stream are both directed through the humidification section before being exhausted from the stack.

The above and other objects are achieved by an electrochemical fuel cell stack comprising:
(A) a hydrogen-containing inlet fuel stream;
(B) an oxygen-containing inlet oxidant stream;
(C) an inlet coolant water stream;
(D) a humidification section comprising:
  (1) a fuel humidification portion comprising a fuel humidification water supply and means for imparting water vapor from the fuel humidification water supply to the inlet fuel stream to produce a humidified fuel stream;
  (2) an oxidant humidification portion comprising an oxidant humidification water supply and means for imparting water vapor from the oxidant humidification water supply to the inlet oxidant stream to produce a humidified oxidant stream;

(E) an electrochemically active section comprising:
(1) at least one fuel cell comprising:
(a) an anode having an inlet for directing the humidified fuel stream to the catalytically active portion of the anode;
(b) a cathode having an inlet for directing the humidified oxidant stream to the catalytically active portion of the cathode; and
(c) an ion exchange membrane interposed between the anode and the cathode;
(2) at least one coolant passage having an inlet for directing the inlet coolant water stream into thermal contact with the electrochemically active section to absorb heat generated within the active section and produce an outlet coolant water stream;

wherein the humidification section is located upstream from the electrochemically active section such that the inlet fuel stream and the inlet oxidant stream are introduced into the fuel humidification portion and the oxidant humidification portion, respectively, without first being directed through the electrochemically active section.

In the preferred fuel cell stack, the anode further produces an outlet fuel stream and the cathode further produces an outlet oxidant stream, the outlet fuel stream and the outlet oxidant stream both being directed through passages formed in the humidification section before the streams are exhausted from the stack.

In the preferred fuel cell stack, the fuel humidification water supply and the oxidant humidification water supply are drawn from a common water supply. At least a portion of the common water supply is preferably drawn from the water formed at the cathode.

DETAILED DESCRIPTION OF THE PREFERRED EMBODIMENTS

Figure 1A:
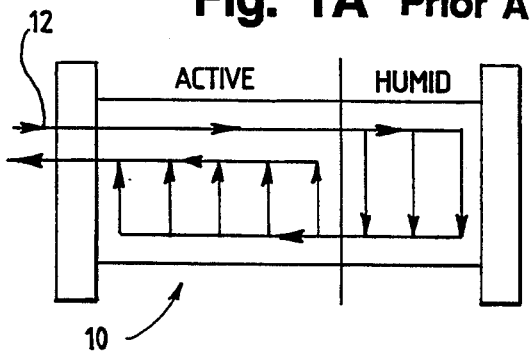
FIGS. 1A, 1B and 1C are schematic diagrams of the respective fuel, oxidant and coolant streams within the humidification and electrochemically active sections of a conventional, prior art fuel cell stack with a humidification section located downstream from the electrochemically active section.
Figure 1B:
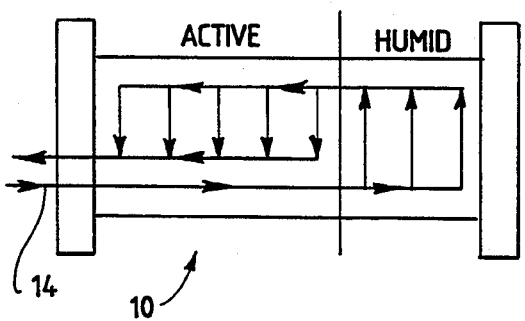
Figure 1C:
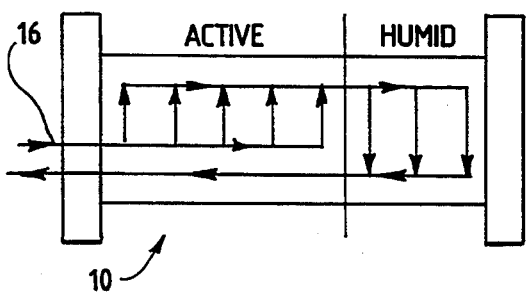

Turning first to FIGS. 1A, 1B and 1C, the respective fuel, oxidant and coolant streams within the humidification and electrochemically active sections of a conventional, prior art fuel cell stack 10 are shown schematically. In FIG. 1A, the fuel stream 12 is illustrated entering the stack 10, passing through a manifold in the active section, where fuel stream 12 is conditioned to approximately the operating temperature of the stack, and then flowing through the humidification section of the stack, where water vapor is imparted to the stream in parallel humidification cells. Once humidified, fuel stream 12 returns to the active section where it participates with the oxidant stream (schematically illustrated in FIG. 1B) in the electrochemical reaction in parallel reaction cells. The fuel stream 12 exiting the cells of the active section is then exhausted from the stack 10.

In FIG. 1B, the oxidant stream 14 is illustrated entering the stack 10, passing through a manifold in the active section, where oxidant stream 14 is conditioned to approximately the operating temperature of the stack, and then flowing through the humidification section of the stack, where water vapor is imparted to the stream in parallel humidification cells. Once humidified, oxidant stream 14 returns to the active section where it participates with the fuel stream (schematically illustrated in FIG. 1A) in the electrochemical reaction in parallel reaction cells. The oxidant stream 14 exiting the cells of the active section is then exhausted from the stack 10.

In FIG. 1C, the coolant stream 16 is illustrated entering stack 10, where it is immediately directed through coolant cells or jackets in the active section to absorb heat generated by the electrochemical reaction. Once heated in the active section, the coolant stream 16 is directed to the humidification section, where it is employed as the water vapor source for humidifying the fuel and oxidant streams (schematically illustrated in FIGS. 1A and 1B, respectively). The coolant stream 16 exiting the humidification section is then exhausted from the stack 10.

Figure 2A:
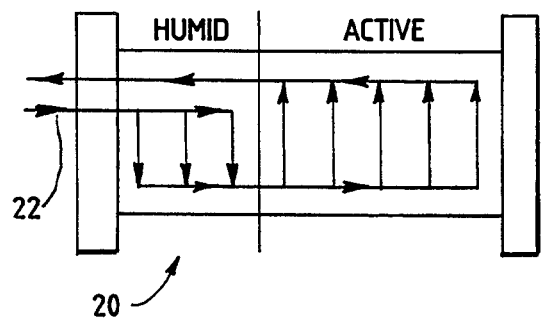
FIGS. 2A, 2B and 2C are schematic diagrams of the respective fuel, oxidant and coolant streams within the humidification and electrochemically active sections of a fuel cell stack with a humidification section located upstream from the electrochemically active section.
Figure 2B:
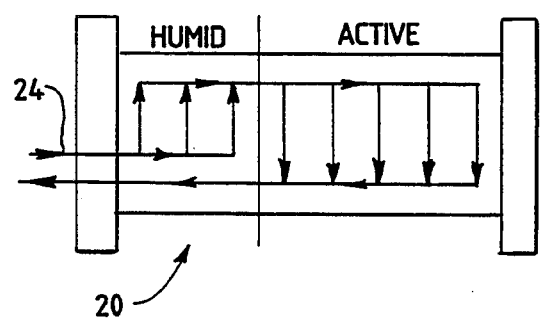
Figure 2C:
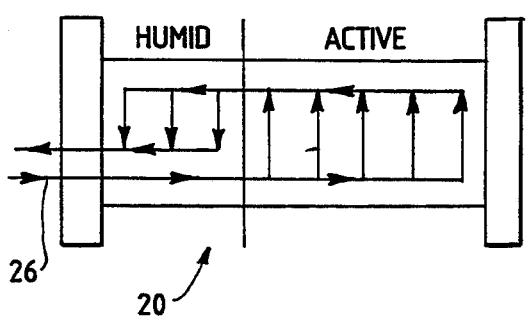

FIGS. 2A, 2B and 2C schematically illustrate the respective fuel, oxidant and coolant streams within the humidification and electrochemically active sections of a fuel cell stack 20 with a humidification section located upstream from the electrochemically active section. In FIG. 2A, the fuel stream 22 is illustrated entering the stack 20, where it immediately flows through the humidification section of the stack and water vapor is imparted to the stream in parallel humidification cells. Once humidified, fuel stream 22 is directed to the active section where it participates with the oxidant stream (schematically illustrated in FIG. 2B) in the electrochemical reaction in parallel reaction cells. The fuel stream 22 exiting the cells in the active section then passes through a manifold in the humidification section and is exhausted from the stack 20.

In FIG. 2B, the oxidant stream 24 is illustrated entering the stack 20, where it immediately flows through the humidification section of the stack and water vapor is imparted to the stream in parallel humidification cells. Once humidified, oxidant stream 24 is directed to the active section where it participates with the fuel stream (schematically illustrated in FIG. 2A) in the electrochemical reaction in parallel reaction cells. The oxidant stream 24 exiting the cells in the active section then passes through a manifold in the humidification section and is exhausted from the stack 20.

In FIG. 2C, the coolant stream 26 passes through a manifold in the humidification section to the active section, where it is directed through the coolant cells or jackets to absorb heat generated by the electrochemical reaction in the active section. Once heated in the active section, the coolant stream 26 is directed to the humidification section, where it is employed as the water vapor source for humidifying the fuel and oxidant streams (schematically illustrated in FIGS. 2A and 2B, respectively). The coolant stream 26 exiting the humidification section is then exhausted from the stack 20.

Figure 3:
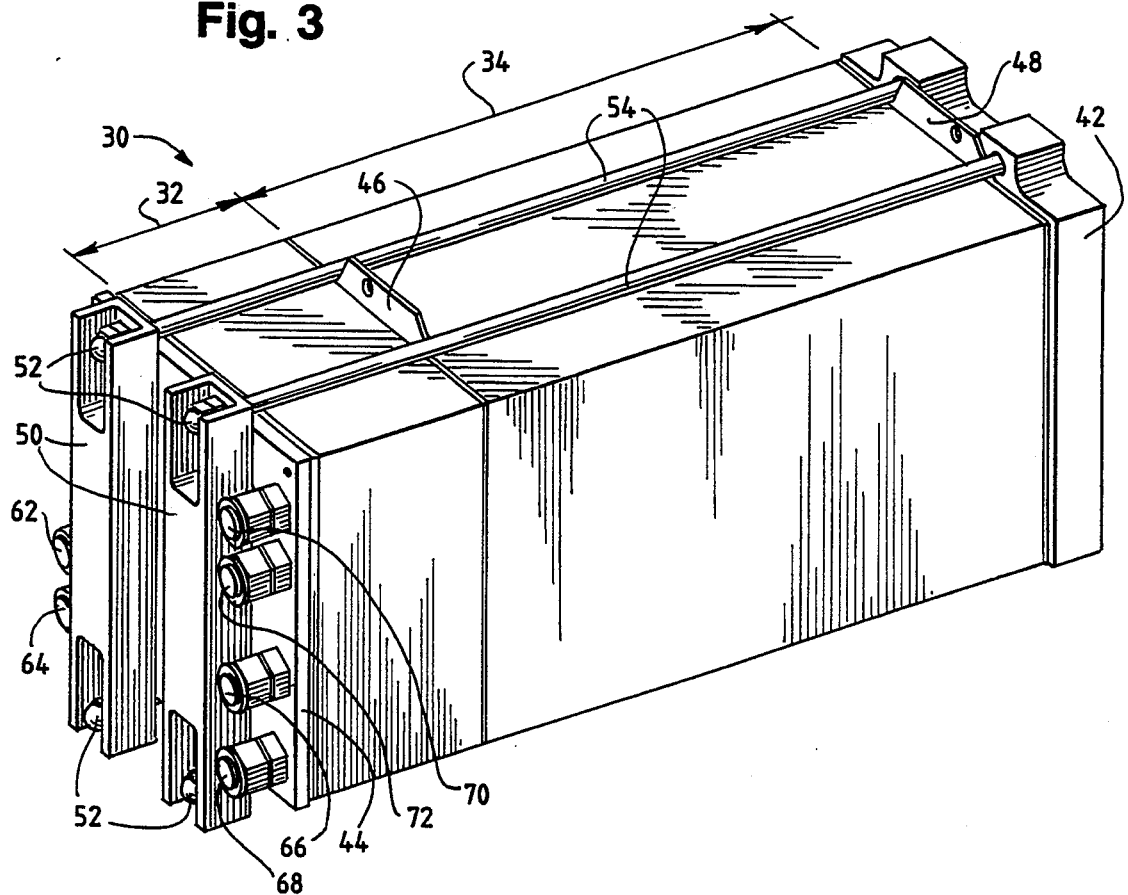
FIG. 3 is a perspective view of an electrochemical fuel cell stack with a humidification section located upstream from its electrochemically active section.

FIG. 3 shows an electrochemical fuel cell stack 30 with a humidification section 32 located upstream from the electrochemically active section 34. Stack 30 is a modular plate and frame design, and includes a compression end plate 42 and a fluid end plate 44. Compression end plate 42 has a pneumatic bladder (not shown) mounted on its surface facing active section 34, which compresses the plates which make up fuel cell stack 30, thereby promoting sealing and electrical contact between the plates of the stack. Bus plates 46 and 48, which are located on opposite ends of active section 34, provide the negative and positive contacts, respectively, to draw current generated by the assembly to a load (not shown in FIG. 3). Tie rods 54 extend between fluid end plate 44 and compression bars 50 to retain and secure stack 30 in its assembled state with fastening nuts 52.

As shown in FIG. 3, fluid end plate 44 has extending therefrom the six inlet and outlet ports for connecting the incoming and outgoing reactant and coolant streams to the stack. The ports are inlet fuel stream port 62, outlet fuel stream port 64, inlet oxidant stream port 66, outlet oxidant stream port 68, inlet coolant stream port 70, and outlet coolant stream port 72.

Figure 4:
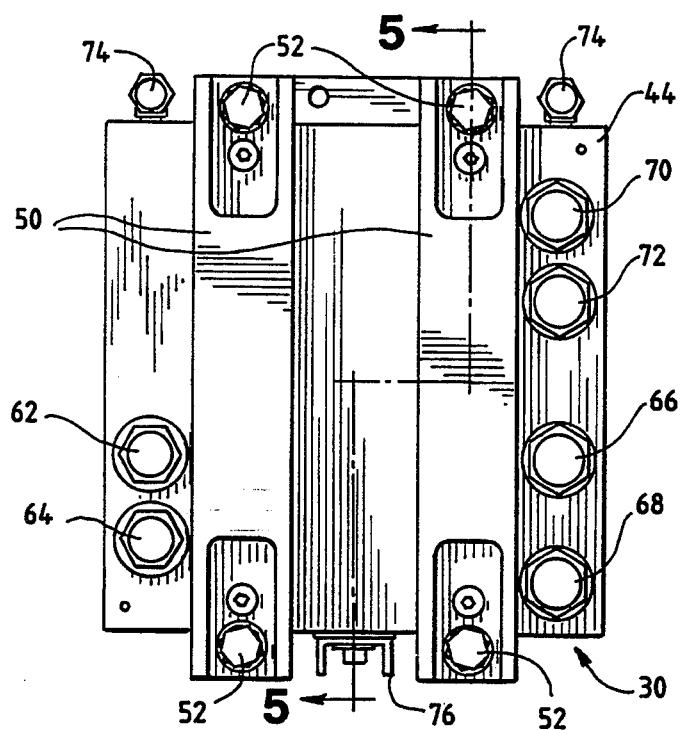
FIG. 4 is an front end elevation view of the electrochemical fuel cell stack illustrated in FIG. 3.

FIG. 4 is a front end elevation view of the electrochemical fuel cell stack illustrated in FIG. 3. FIG. 4 shows fluid end plate 44 and compression bars 50 retaining and securing stack 30 in its assembled state with fastening nuts 52. Inlet fuel stream port 62, outlet fuel stream port 64, inlet oxidant stream port 66, outlet oxidant stream port 68, inlet coolant stream port 70, and outlet coolant stream port 72 extend from fluid end plate 44. Ports 74 and support channel member 76 are described in more detail below in connection with FIGS. 5 and 6.

Figure 5:
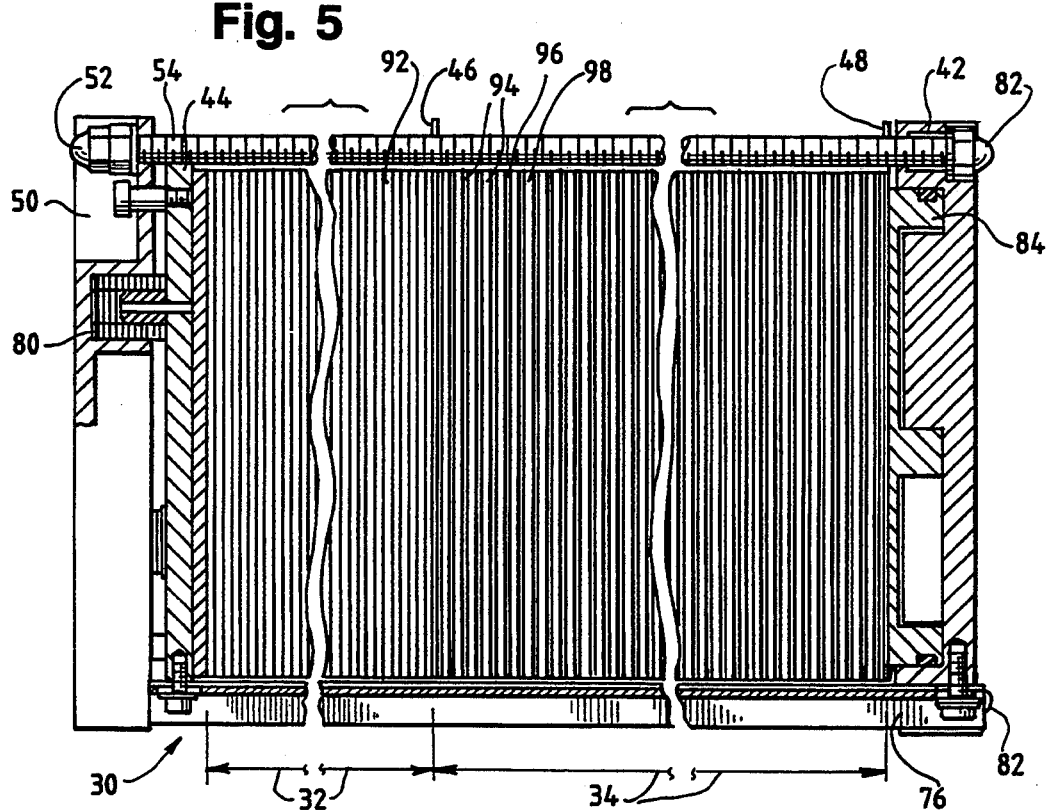
FIG. 5 is a sectional view of the electrochemical fuel cell stack taken in the direction of arrows A—A in FIG. 4.

FIG. 5 is a sectional view of the stack 30 taken in the direction of arrows A—A in FIG. 4. As shown in FIG. 5, active section 34 includes, in addition to bus plates 46 and 48, a plurality of recurring fuel cell units. Each cell consists of a membrane electrode assembly 96 interposed between two reactant flow field plates 94. A coolant flow field plate 98 is inserted at regular intervals to provide a cooling cell or jacket 98 for removing heat generated by the electrochemical reaction occurring in the cells of the active section 34. The cells of the active section 34 are electrically coupled in series by virtue of the contact between the electrically conductive sheets that form the layers of the cells.

As shown in FIG. 5, humidification section 32 includes a plurality of humidification cells, one of which is designated in FIG. 5 as humidification cell 92. Each humidification cell 92 consists of a reactant fluid flow field plate (not shown in FIG. 5), a water flow field plate (not shown), and a water vapor transport membrane (not shown) interposed between the reactant fluid flow field plate and the water flow field plate. In humidification section 32, water vapor is imparted to the fuel and oxidant streams prior to introducing the reactant streams to active section 34.

Further components of the compression bars 50 and the compression end plate 42 are also shown in FIG. 5. Each compression bar 50 has a plurality of disc-spring washers 80 stacked in a cavity formed in its underside to urge the compression bar 50 away from the remainder of stack 30, thereby compressing the layers to promote sealing of the stack. Compression end plate 42 has a pneumatic piston 84 positioned within it to apply uniform pressure to the assembly, thereby promoting sealing. Support channel member 76, the ends of which are also shown in FIGS. 4 and 6, extends the length of humidification section 32 and active section 34 in order to preserve the alignment and prevent the sagging of the plates which make up stack 30.

Figure 6:
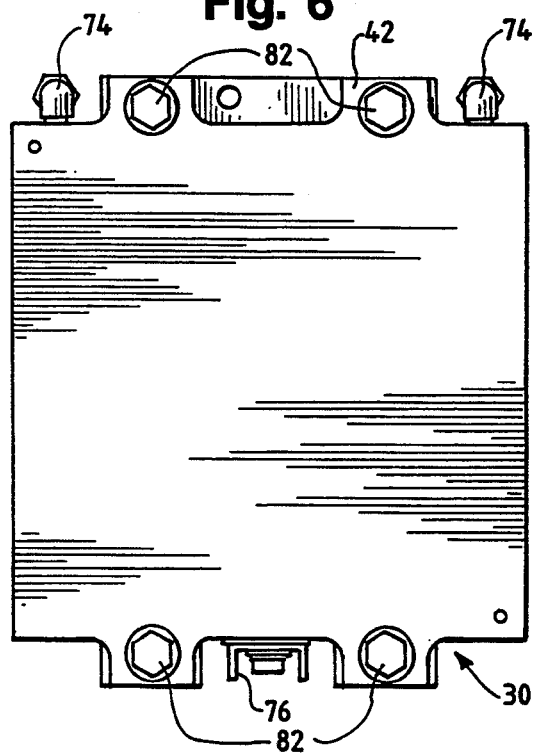
FIG. 6 is a rear end elevation view of the electrochemical fuel cell stack illustrated in FIGS. 3–5, showing the end opposite that illustrated in FIG. 4.

FIG. 6 is a rear end elevation view of stack 30 illustrated in FIG. 3, showing the end opposite that illustrated in FIG. 4. Compression end plate 42 is retained and secured to the remainder of stack 30 by bolt heads 82 located at the end of tie rods 54 opposite fastening nuts 52 (not shown in FIG. 6). Ports 74, also shown in FIG. 4, allow the introduction of pressurized fluid to the bladder between pneumatic piston 84 and compression end plate 42 (see FIG. 5), thereby promoting sealing and electrical contact between the plates which make up stack 30.

Figure 7:
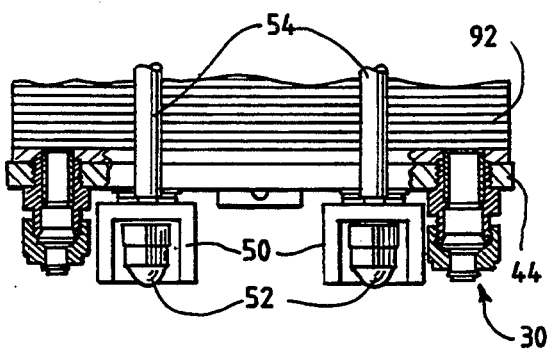
FIG. 7 is a partial top view, partially in section of the electrochemical fuel cell stack illustrated in FIGS. 3–5.

FIG. 7 is a partial top view, partially in section, of stack 30 illustrated in FIGS. 3-5. A portion of the humidification section, which includes humidification cell 92, is illustrated in FIG. 7. FIG. 7 also shows compression bars 50 secured to stack 30 by nuts 52 at the end of tie rods 54.

Figure 8:
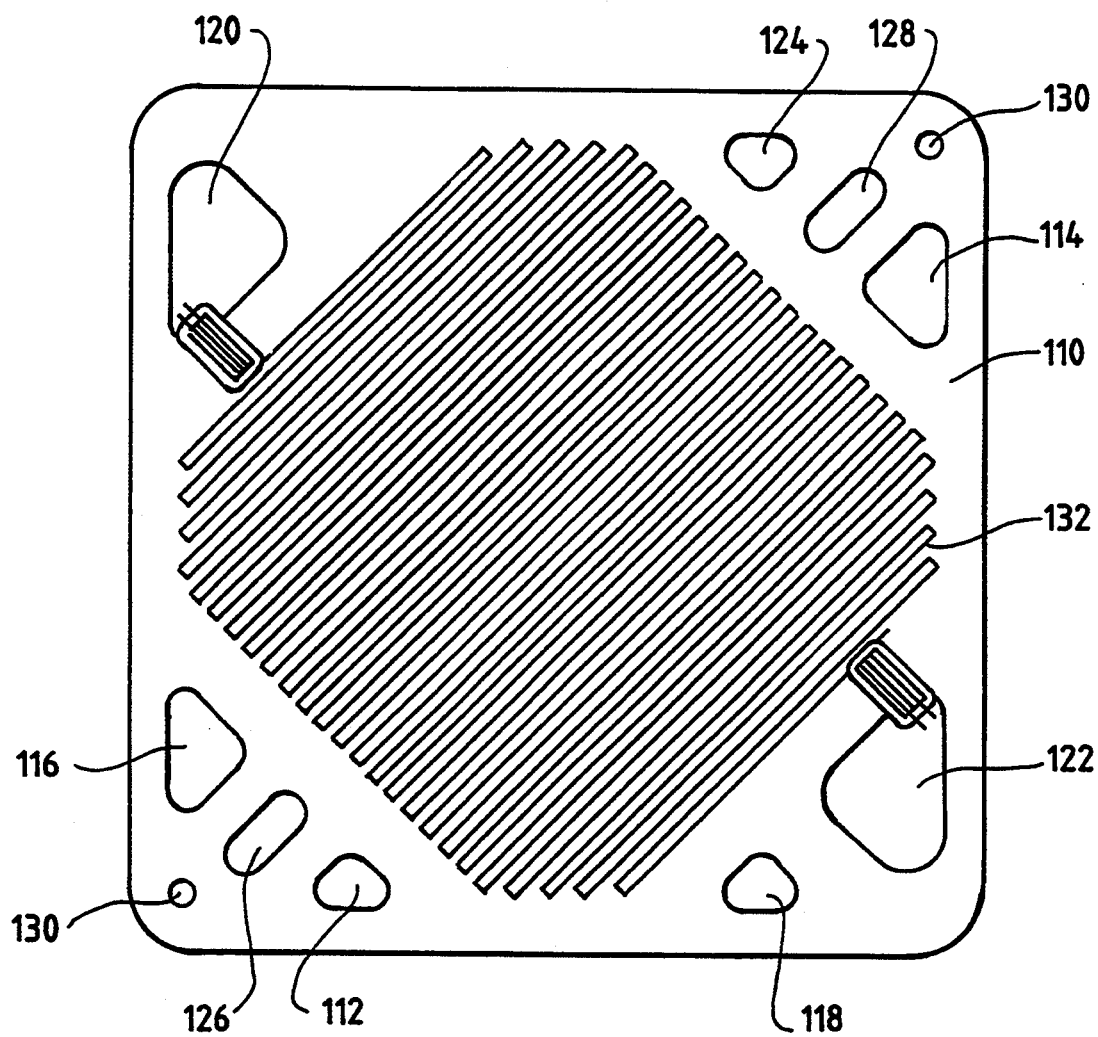
FIG. 8 is an end elevation view of a reactant fluid flow field plate from the active section of a conventional, prior art fuel cell stack, showing the nine manifold openings for the fuel, oxidant and coolant streams.

FIG. 8 is an end elevation view of a reactant fluid flow field plate 110 from the active section of a conventional, prior art fuel cell stack, showing the nine manifold openings for the fuel, oxidant and coolant streams. The manifold openings in plate 110 are inlet fuel manifold opening 112, humidified fuel manifold opening 114, outlet fuel manifold opening 116, inlet oxidant manifold opening 118, humidified oxidant manifold opening 120, and outlet oxidant manifold opening 122, inlet coolant manifold opening 124, coolant/humidification fluid manifold opening 126, and outlet coolant manifold opening 128. Water is the preferred coolant and humidification fluid. Alignment pin openings 130 are also formed in plate 110. As shown in FIG. 8, the presence of the manifold openings in plate 110 restricts the amount of area available on the surface of plate 110 for the reactant flow field channel 132, which traverses a serpentine path across the central, electrochemically active area of plate 110.

Figure 9A:
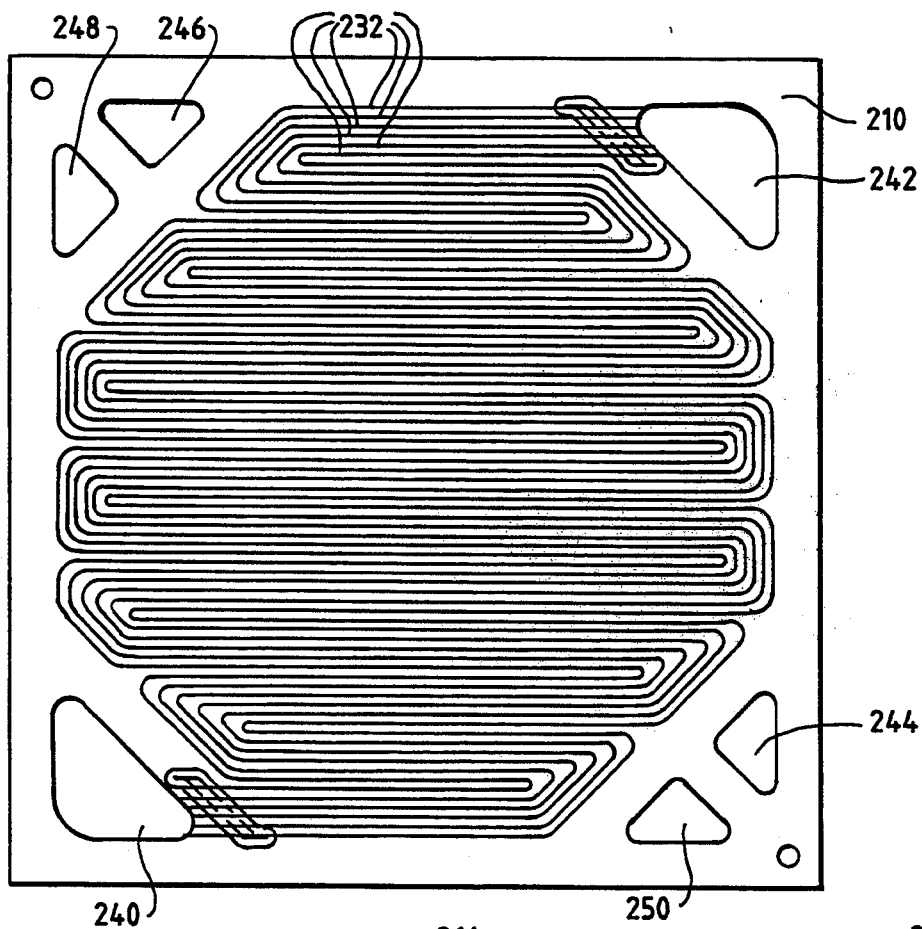
FIG. 9A is an end elevation view of one side of an oxidant/coolant fluid flow field plate from the active section of the fuel cell stack illustrated in FIGS. 3–7, showing the six manifold openings for the fuel, oxidant and coolant streams.

FIG. 9A shows one side of an oxidant/coolant fluid flow field plate 210 from the active section of the fuel cell stack illustrated in FIGS. 3–7. The manifold openings in plate 210 are humidified fuel manifold opening 244, outlet fuel manifold opening 246, humidified oxidant manifold opening 240, outlet oxidant manifold opening 242, inlet coolant manifold opening 248, and coolant/humidification fluid manifold opening 250. The surface of plate 210 illustrated in FIG. 9A has formed therein a plurality of oxidant fluid flow channels 232 which traverse a serpentine path across the central, electrochemically active area of plate 210. The reduction in the number of manifold openings from nine in FIG. 8 to six in FIG. 9A increases the area available to participate in the electrochemical reaction.

Figure 9B:
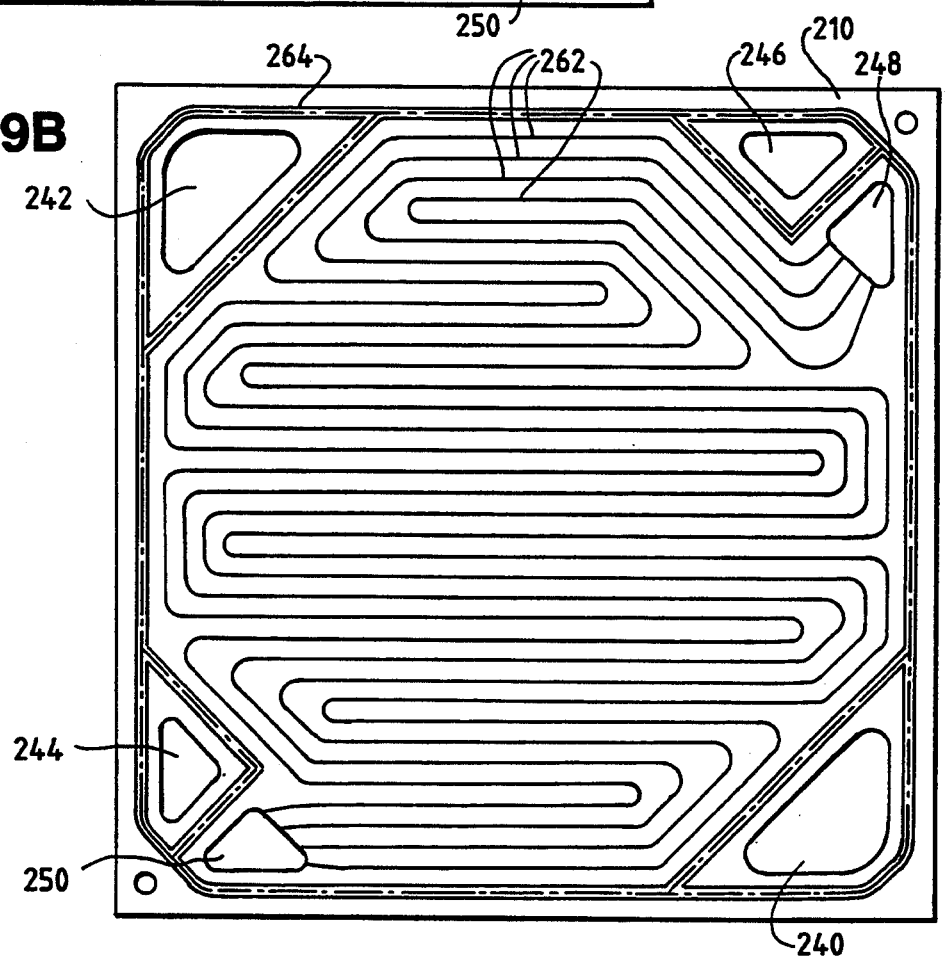
FIG. 9B is an end elevation view of the opposite side of the oxidant/coolant fluid flow field plate shown in FIG. 9A.

FIG. 9B is an end elevation view of the opposite side of the oxidant/coolant fluid flow field plate 210 shown in FIG. 9A. In addition to the six manifold openings illustrated and described above for FIG. 9A, the opposite surface of plate 210 shown in FIG. 9B has formed therein a plurality of coolant fluid flow channels 262 which traverse a serpentine path across the central, electrochemically active area of plate 210. As in FIG. 9A, the reduction in the number of manifold openings from nine in FIG. 8 to six in FIG. 9B increases the area available to direct coolant fluid to absorb heat from the electrochemical reaction. A sealant material 264 circumscribes each of the reactant manifold openings to isolate the central, coolant flow field portion of plate 210 from the reactant streams.

Figure 10A:
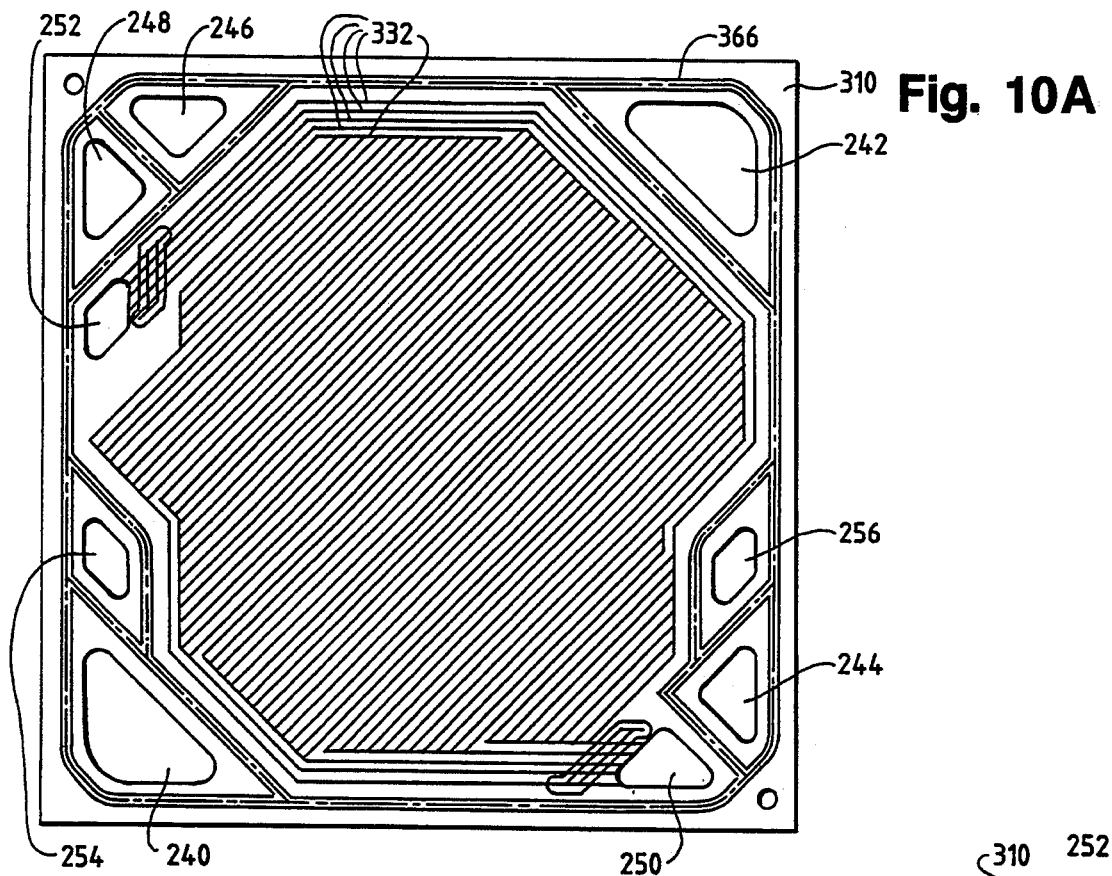
FIG. 10A is an end elevation view of a fluid flow field plate from the humidification section of the fuel cell stack illustrated in FIGS. 3–7, showing the nine manifold openings for the fuel, oxidant and coolant streams.

FIG. 10A is an end elevation view of a humidification fluid (water) flow field plate 310 from the humidification section of the fuel cell stack illustrated in FIGS. 3–7, showing the nine manifold openings for the fuel, oxidant and coolant streams. The manifold openings 240, 242, 244, 246, 248 and 250 in plate 310 are the same six manifold openings illustrated and described above for plate 210 in FIG. 9A. The surface of plate 310 illustrated in FIG. 10A has formed therein a plurality of humidification fluid flow channels which traverse multiple parallel paths between header channels, five of which are designated in FIG. 10A as header channels 332, across the central portion of the humidification plate 310. Plate 310 also has formed therein three additional manifold openings, namely, outlet oxidant manifold opening 254, outlet fuel manifold opening 256, and inlet coolant manifold opening 252. A sealant material 366 circumscribes each of the reactant manifold openings to isolate the central portion of plate 210 from the reactant streams.

Figure 10B:
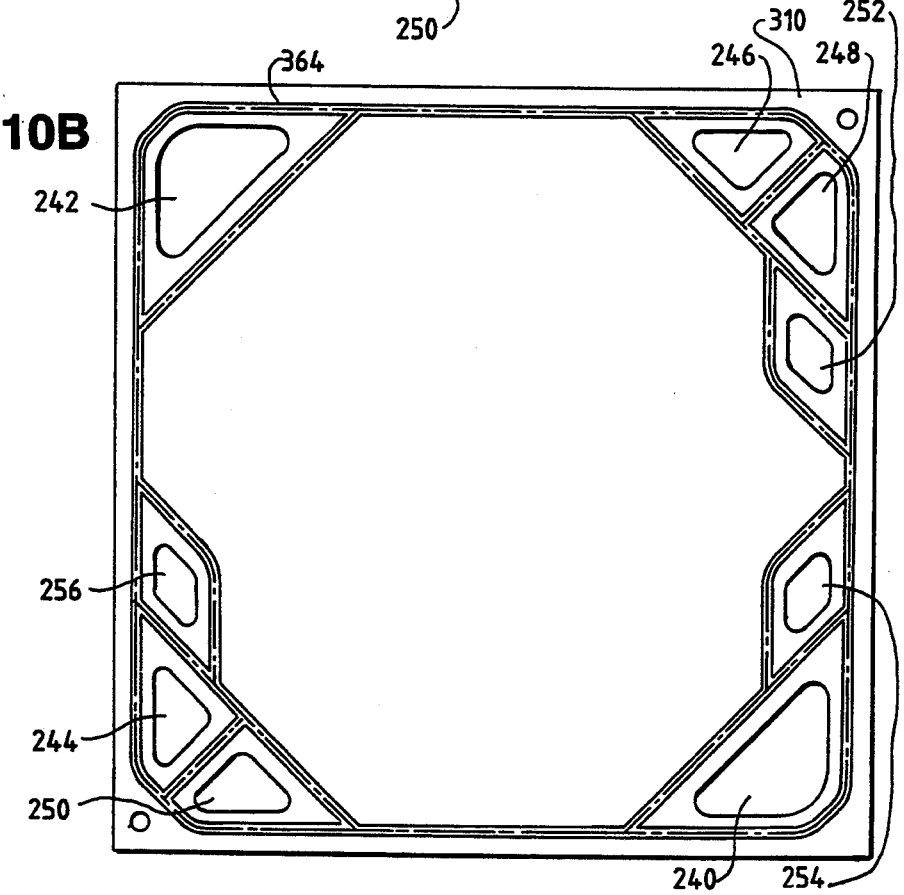
FIG. 10B is an end elevation view of the opposite side of the humidification fluid flow field plate shown in FIG. 10A.

FIG. 10B is an end elevation view of the opposite side of the humidification fluid flow field plate shown in FIG. 10A. The central portion of surface of plate 310 shown in FIG. 10B is blank in view of the illustrated plate being located endmost in the humidification section. A sealant material 364 circumscribes each of the manifold openings to isolate the central portion of plate 310 from the various reactant and coolant streams.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell stack comprising an inlet fuel stream, an inlet oxidant stream, a humidification section and an electrochemically active section, said humidification section disposed upstream from said active section such that said inlet fuel stream and said inlet oxidant stream are introduced into said humidification section without first being directed through said active section.

2. The electrochemical fuel cell stack of claim 1 further comprising an outlet fuel stream and an outlet oxidant stream, wherein said outlet fuel stream and said outlet oxidant stream are both directed through said humidification section before being exhausted from the stack.

3. An electrochemical fuel cell stack comprising:
   (A) a hydrogen-containing inlet fuel stream;
   (B) an oxygen-containing inlet oxidant stream;
   (C) an inlet coolant water stream;
   (D) a humidification section comprising:
      (1) a fuel humidification portion comprising a fuel humidification water supply and means for imparting water vapor from said fuel humidification water supply to said inlet fuel stream to produce a humidified fuel stream;
      (2) an oxidant humidification portion comprising an oxidant humidification water supply and means for imparting water vapor from said oxidant humidification water supply to said inlet oxidant stream to produce a humidified oxidant stream;
   (E) an electrochemically active section comprising:
      (1) at least one fuel cell comprising:
         (a) an anode having an inlet for directing said humidified fuel stream to the catalytically active portion of said anode;
         (b) a cathode having an inlet for directing said humidified oxidant stream to the catalytically active portion of said cathode; and
         (c) an ion exchange membrane interposed between said anode and said cathode;
      (2) at least one coolant passage having an inlet for directing said inlet coolant water stream into thermal contact with said electrochemically active section to absorb heat generated within said active section and produce an outlet coolant water stream;
wherein said humidification section is located upstream from said electrochemically active section such that said inlet fuel stream and said inlet oxidant stream are introduced into said fuel humidification portion and said oxidant humidification portion, respectively, without first being directed through said electrochemically active section.

4. The electrochemical fuel cell stack of claim 3 wherein said anode further produces an outlet fuel stream and said cathode further produces an outlet oxidant stream, said outlet fuel stream and said outlet oxidant stream are both being directed through passages formed in said humidification section before said streams are exhausted from the stack.

5. The electrochemical fuel cell stack of claim 3 wherein said fuel humidification water supply and said oxidant humidification water supply are drawn from a common water supply.

6. The electrochemical fuel cell stack of claim 5 wherein at least a portion of said common water supply is drawn from the water formed electrochemically at said cathode.

* * * * *

UNITED STATES PATENT AND TRADEMARK OFFICE
CERTIFICATE OF CORRECTION

PATENT NO. : 5,382,478
DATED : January 17, 1995
INVENTOR(S) : Chow et al.

It is certified that error appears in the above-indentified patent and that said Letters Patent is hereby corrected as shown below:

On title page, add the name of Henry H. Voss as joint inventor

Please insert the following paragraph in col. 1, line 6, before the first line of the specification:

--This is a continuation-in-part of application Serial No. 07/970,614 filed November 3, 1992, now U.S. Patent No. 5,366,818.--.

Signed and Sealed this

Ninth Day of May, 1995

Attest:

BRUCE LEHMAN

*Attesting Officer*   *Commissioner of Patents and Trademarks*